United States Patent [19]
Calero et al.

[11] Patent Number: 5,796,629
[45] Date of Patent: Aug. 18, 1998

[54] PROTECTIVE RELAYING SYSTEM COMPRISING NUMERICAL COMPARATOR-BASED LINE DIFFERENTIAL PROCESSING CIRCUITRY

[75] Inventors: Fernando Calero, Miami; Eric Udren, Coral Springs, both of Fla.

[73] Assignee: ABB Power T&D Company, Inc., Raleigh, N.C.

[21] Appl. No.: 574,374

[22] Filed: Dec. 18, 1995

[51] Int. Cl.$^6$ .............................. H02H 3/00; G06F 19/00
[52] U.S. Cl. ........................... 364/492; 364/483; 361/78
[58] Field of Search ........................ 364/492, 483, 364/480, 572; 324/76.15, 418, 424, 76.11; 361/1, 5, 76, 85, 87, 20, 78, 160

[56] References Cited

U.S. PATENT DOCUMENTS

| | | |
|---|---|---|
| 4,208,687 | 6/1980 | Sun et al. ........................ 361/20 |
| 4,725,914 | 2/1988 | Garity ........................... 361/76 |
| 4,968,960 | 11/1990 | Bouhenguel et al. ............... 335/101 |
| 5,576,618 | 11/1996 | Calero .......................... 324/76.15 |

*Primary Examiner*—Melanie Kemper
*Attorney, Agent, or Firm*—Woodcock Washburn Kurtz Mackiewicz & Norris LLP

[57] ABSTRACT

Disclosed is a protective relaying system that trips a local circuit breaker (BL) connected to a transmission line by providing a trip signal ("TRIP_BL") to the circuit breaker. The system comprises a local filter operatively coupled to the transmission line, and a local relay operatively coupled to the filter. The local filter receives inputs indicative of phase currents on the transmission line and provides an output ("VFL$_k$") derived from the inputs. The local relay (1) receives the output (VFL$_k$) of the local filter, (2) receives an output ("VFR1$_k$", "VFR2$_k$") of at least one remote filter, and (3) generates the trip signal. The local filter and relay preferably employ substantially all digital electronic circuitry to generate the trip signal.

21 Claims, 6 Drawing Sheets

PROTECTIVE RELAYING SYSTEM COMPRISING NUMERICAL COMPARATOR-BASED LINE DIFFERENTIAL PROCESSING CIRCUITRY

FIELD OF THE INVENTION

The present invention relates generally to protective relaying, and more particularly to a protective relaying system employing symmetrical components filters and numerical comparator-based threshold units of the kind disclosed in copending U.S. patent application Ser. No. 08/326,720 filed Oct. 20, 1994, now U.S. Pat. No. 5,576,618, which is incorporated by reference herein.

BACKGROUND OF THE INVENTION

Protective relaying generally involves the performance of one or more of the following functions in connection with a protected power or energy system: (a) monitoring the system to ascertain whether it is in a normal or abnormal state; (b) metering, which involves measuring certain electrical quantities; (c) protection, which typically involves tripping a circuit breaker in response to the detection of a short-circuit condition; and (d) alarming, which provides a warning of some impending problem. In connection with these and other ancillary functions, such as fault detection, detection of power flow direction, over-current detection, etc., the protective relaying system compares or measures phasor quantities (voltages and currents). Generally, the faster such a comparison can be made, the better.

Prior to the invention disclosed in the above-cited U.S. patent application Ser. No. 08/326,720, protective relays compared phasor quantities using frequency domain techniques such as the Fourier transform. The invention disclosed in U.S. patent application Ser. No. 08/326,720 relates to methods and apparatus for comparing phasor quantities in real time using a numerical comparator of the kind employed in preferred embodiments of the present invention. Further background information can be obtained from the above-cited U.S. patent application Ser. No. 08/326,720.

SUMMARY OF THE INVENTION

The present invention employs the numerical comparator principles described in the above-referenced U.S. patent Ser. No. 08/326,720 to implement a protective relaying system, preferred embodiments of which measure only transmission line currents and employ such measurements in a time domain algorithm. The present invention offers improved speed of operation over previous techniques, is numerical (i.e., employs substantially all digital electronic circuitry) and is unaffected by DC offsets.

One presently preferred embodiment of a protective relaying system in accordance with the present invention trips a local circuit breaker (BL) connected to a transmission line by providing a trip signal ("TRIP_BL") to the circuit breaker. This system comprises a local filter operatively coupled to the transmission line, and a local relay operatively coupled to the filter. The local filter receives inputs indicative of phase currents on the transmission line and provides an output ("$VFL_k$") derived from the inputs. The local relay comprises means for (1) receiving the output ($VFL_k$) of the local filter, (2) receiving an output ("$VFR1_k$", "$VFR2_k$") of at least one remote filter, and (3) generating the trip signal. The local relay preferably employs substantially all digital electronic circuitry to generate the trip signal.

Another embodiment of a protective relaying system in accordance with the present invention comprises a local filter comprising substantially all digital electronic circuitry for obtaining digital phase current inputs ("$IA_k$", "$IB_k$", "$IC_k$") and combining the digital phase current inputs to provide an output $VFL_k$; and a local relay comprising means for (1) receiving the output ($VFL_k$), (2) receiving an output ($VFR1_k$, $VFR2_k$) of at least one remote filter, and (3) generating a trip signal (TRIP_BL) for tripping a circuit breaker.

In the specific preferred embodiments disclosed in detail below, the local relay comprises threshold means for computing a first value ($MRES_k$) and a second value ($MOP_k$); wherein the first value ($MRES_k$) is a function of a sum of the respective energies of the output ($VFL_k$) of the local filter and the output(s) ($VFR1_k$, $VFR2_k$) of the remote filter(s), and wherein the second value ($MOP_k$) is a function of the energy of a sum of the output ($VFL_k$) of the local filter and the output(s) ($VFR_k$, $VFR2_k$) of the remote filter(s). Further, the threshold means comprises a first threshold unit for computing a first torque value ($ML_k$), a second threshold unit for computing a second torque value ($MR1_k$), and a third threshold unit for computing a third torque value ($MR2_k$), the first, second and third torque values being generated in accordance with the following formulas:

| Formula for $ML_k$ | | |
|---|---|---|
| $S1\_L_k$ | = | $VFL_k$ |
| $S2\_L_k$ | = | $VFL_k + VFL_{k-1}$ |
| $B1\_L_k$ | = | $FK2 (S1\_L_k + S1\_L_{k-1}) - FK1\ B1\_L_{k-1})$ |
| $B2\_L_k$ | = | $FK2 (S2\_L_k + S2\_L_{k-1}) - FK1\ B2\_L_{k-1})$ |
| $ML_k$ | = | $(B2\_L_k\ B1\_L_{k-1} - B1\_L_k\ B2\_L_{k-1})$ |
| Formula for $MR1_k$ | | |
| $S1\_R1_k$ | = | $VFR1_k$ |
| $S2\_R1_k$ | = | $VFR1_k + VFR1_{k-1}$ |
| $B1\_R1_k$ | = | $FK2 (S1\_R1_k + S1\_R1_{k-1}) - FK1\ B1\_R1_{k-1})$ |
| $B2\_R1_k$ | = | $FK2 (S2\_R1_k + S2\_R1_{k-1}) - FK1\ B2\_R1_{k-1})$ |
| $MR1_k$ | = | $(B2\_R1_k\ B1\_R1_{k-1} - B1\_R1_k\ B2\_R1_{k-1})$ |
| Formula for $MR2_k$ | | |
| $S1\_R2_k$ | = | $VFR2_k$ |
| $S2\_R2_k$ | = | $VFR2_k + VFR2_{k-1}$ |
| $B1\_R2_k$ | = | $FK2 (S1\_R2_k + S1\_R2_{k-1}) - FK1\ B1\_R2_{k-1})$ |
| $B2\_R2_k$ | = | $FK2 (S2\_R2_k + S2\_R2_{k-1}) - FK1\ B2\_R2_{k-1})$ |
| $MR2_k$ | = | $(B2\_R2_k\ B1\_R2_{k-1} - B1\_R2_k\ B2\_R2_{k-1})$; | wherein FK1 and FK2 are predetermined constants.

In the specific preferred embodiments disclosed in detail below, the threshold means further comprises a fourth threshold unit for computing the second value ($MOP_k$) in accordance with the following formula:

| Formula for $MOP_k$ | | |
|---|---|---|
| $S1\_L\_R1\_R2_k$ | = | $VFL_k + VFR1_k + VFR2_k$ |
| $S2\_L\_R1\_R2_k$ | = | $S1\_L\_R1\_R2_k + S1\_L\_R1\_R2_{k-1}$ |
| $B1\_L\_R1\_R2_k$ | = | $FK2 (S1\_L_k + S1\_L_{k-1}) - FK1\ L_{k-1})$ |
| $B2\_L\_R1\_R2_k$ | = | $FK2 (S2\_L_k + S2\_L_{k-1}) - FK1\ B2\_L_{k-1})$ |
| $MOP_k$ | = | $(B2\_L_k\ B1\_L_{k-1\ 2} - B1\_L_k\ B2\_L_{k-1})$. |

In addition, in the embodiments disclosed in detail below the threshold means comprises numerical trip comparator means for generating the trip signal (TRIP_BL), which is a substantially binary signal whose value is set in accordance with the result of the following comparison:

$$MOP_k-(K1)MRES_k > MC,$$

wherein K1 and MC are predetermined constants. The numerical trip comparator means comprises means for generating a signal ($\theta_k$) in accordance with the following formula:

$$\theta_k = EE((CC)(MOP_k-(K1)MRES_k-MC)+(FF)\theta_{k-1}-\theta_{k-2}),$$

wherein CC, EE and FF are predetermined constants. The signal $\theta_k$ is compared to a threshold value and the trip signal (TRIP_BL) is set to a first prescribed state if the signal $\theta_k$ is greater than the threshold value and to a second prescribed state if the signal $\theta_k$ is less than the threshold value.

In the specific preferred embodiments disclosed in detail below, the local filter comprises means for generating the output ($VFL_k$) in accordance with the following formula:

$$I\alpha_k = 2IA_k - IB_k - IC_k$$

$$I\beta_k = K3(IB_k - IC_k)$$

$$I3I1_k = (K2)(I\alpha_k - I\alpha_{k-1}) + (K2\pi f\Delta t)(I\beta_k - I\beta_{k-1})$$

$$I3I2_k = (K2)(I\alpha_k - I\alpha_{k-1}) - (K2\pi f\Delta t)(I\beta_k - I\beta_{k-1})$$

$$I3I0_k = IA_k + IB_k + IC_k$$

$$VF_k = C1 \; I3I1_k + C2 \; I3I2_k + C0 \; I3I0_k.$$

where C1, C2, C0, f, K2, K3 and $\Delta t$ are predetermined constants. For example, in the specific preferred embodiments, $\Delta t$ is a sampling period, K2 is ¼, K3 is $\sqrt{3}$, and f is the operating frequency of the power system, e.g., 50 or 60 Hz?.

Other features and advantages of the invention are disclosed below.

DETAILED DESCRIPTION OF PREFERRED EMBODIMENTS

Current differential protective systems are generally very effective when used in connection with short transmission lines. The HCB-1 and LCB-2 relaying systems available from ABB Power T&D Company, Inc. (the assignee of the present invention) employ a variation of the traditional current differential schemes. In these systems, the trip decision is made on the basis of the combined information available from multiple phase currents (referred to as "IA", "IB" and "IC", respectively, for the three phase currents of the transmission line). The present invention employs a decision process similar to that of the LCB-2 system. At each terminal, the invention creates an output from a symmetrical components filter. The filter output signal is given by:

$$VF = C1 \; I1A + C2 \; I2A + C0 \; I0A \quad (1)$$

where:

VF is the output of the symmetrical components filter,

C1, C2, C0 are weighting constants for the positive, negative and zero components, and I1A, I2A, I0A are positive, negative and zero sequence components of the phase currents relative to phase A.

The present invention can be used with two terminals or more than three terminals. However, the presently preferred embodiments employ three "terminals," i.e., three sets of circuit breaker, filter and relay located near three power sources coupled to the transmission lines to be protected, as illustrated FIG. 1. In the following discussion, it is assumed that one terminal is the "local" terminal and the other two are the "remote"(i.e., "R1" and "R2") terminals. A filter output is generated at each of the terminals, and these outputs are denoted "VFL" for the local terminal, "VFR1" for remote terminal one and "VFR2" for remote terminal two.

Figure 1:
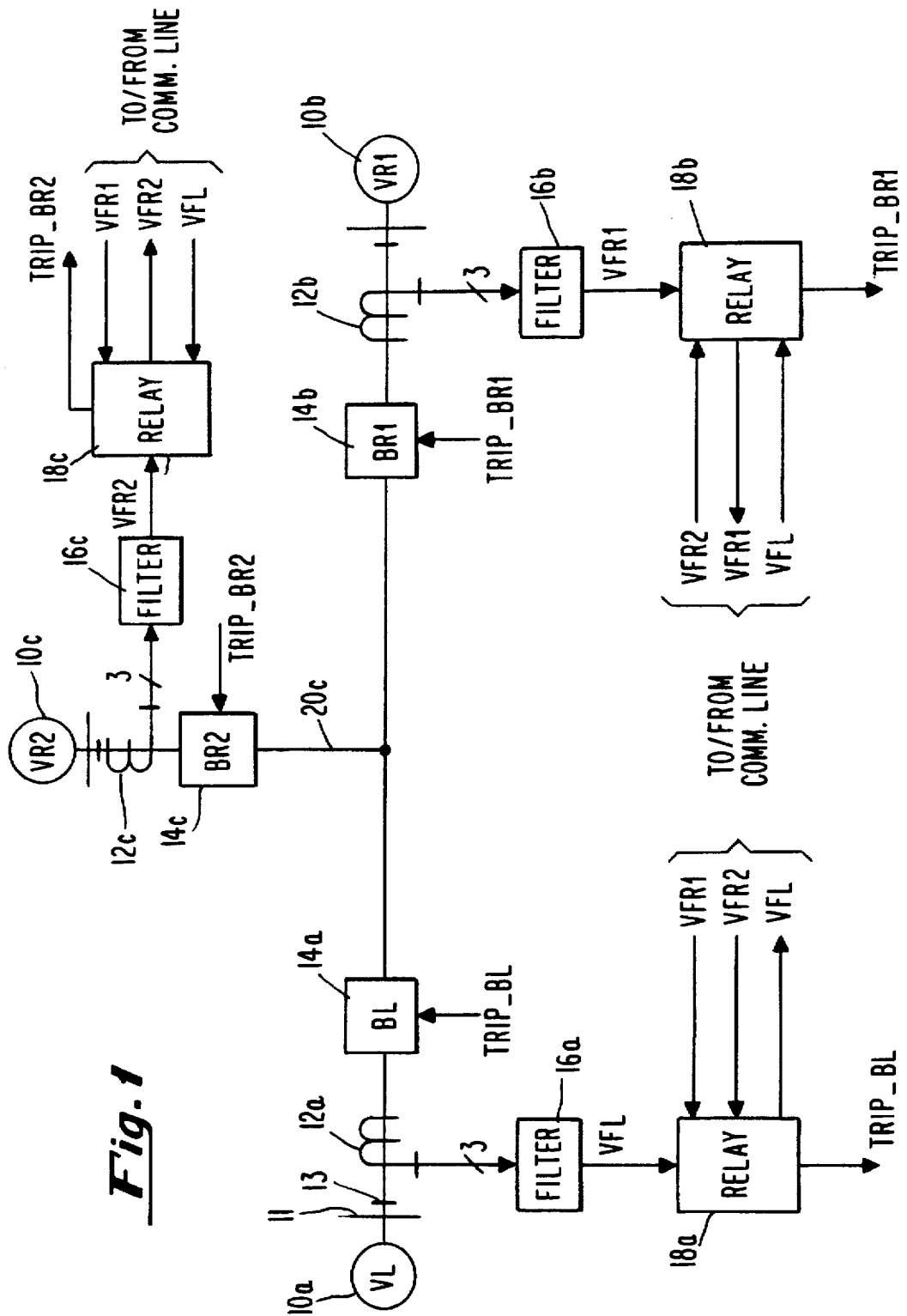
FIG. 1 schematically depicts a protective relaying system in accordance with a presently preferred embodiment of the invention.

At the local terminal, it is assumed that the VFR1 and VFR1 signals are received as illustrated in FIG. 1. In this figure, reference numerals 10a, 10b and 10c refer to the local and two remote power sources, respectively; reference numeral 11 refers to a bus; reference numerals 12a, 12b and 12c refer to the current transformers at the local and remote terminals, respectively; reference numeral 13 refers to a polarity mark (which is a drawing symbol and not part of the invention); reference numerals 14a, 14b and 14c refer to local and remote circuit breakers, respectively (also denoted "BL", "BR1", and "BR2"); reference numerals 16a, 16b and 16c refer to local and remote filters, respectively; reference numerals 18a, 18b and 18c refer to local and remote protective relays, respectively; and reference numerals 20a, 20b and 20c refer to segments of a transmission line.

As shown, the filters 16a, 16b, 16c receive phase current signals corresponding to the A, B, and C phases of the transmission lines 20a, 20b, 20c and provide output signals VFL, VR1, and VR2, respectively, to the relays 18a, 18b and 18c. The relays employ these signals to generate a trip signal for their corresponding circuit breakers. Thus, for example, local relay 18a receives the VFL filter output from local filter 16a and also receives remote filter outputs VFR1 and VFR2 via communications lines (e.g., fiber optic or phone lines), and provides a trip signal denoted "TRIP_BL" to the local circuit breaker 14a.

Figure 2:
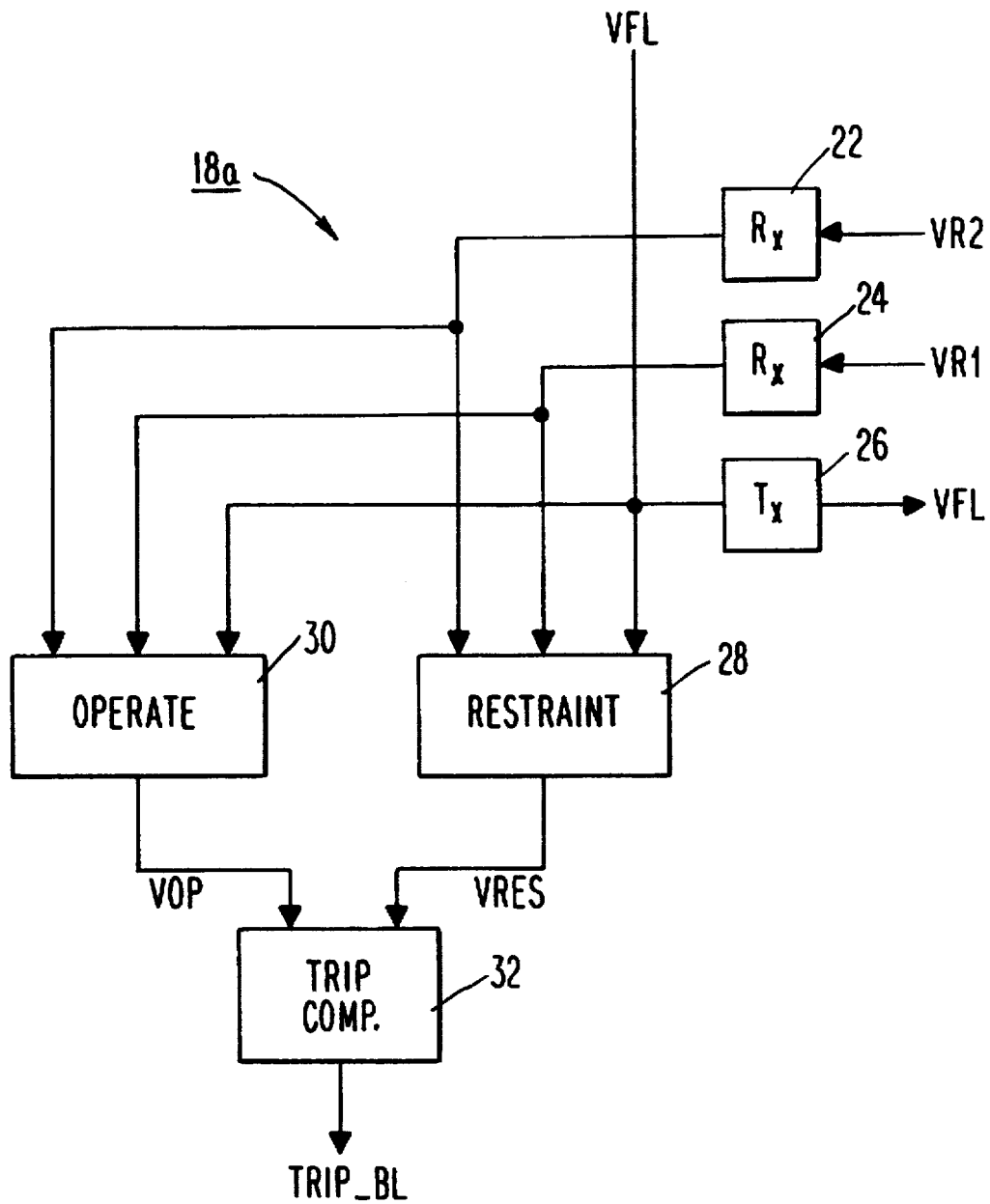
FIG. 2 schematically depicts a relay circuit for generating a trip signal on the basis of local and remote filter output signals.

As shown in FIG. 2, the relay 18a receives the VFL output signal directly from filter 16a whereas it receives the remote filter output signals VR1 and VR2 via the aforementioned communications line and receivers 22 and 24. As also shown in FIG. 2, the local filter output VFL is transmitted via a transmitting device 26 and the communications line to the remote relays 18b and 18c. The relay 18a comprises a first circuit 30 for generating an operating voltage denoted "VOP", on the basis of the local and remote filter output signals (VFL, VFR1, VFR2). The relay 18a further comprises a restraint circuit 28 for generating a restraint voltage, denoted "VRES", on the basis of the local and remote filter output signals. The operating and restraint signals (VOP, VRES) are employed by a trip comparator circuit 32 to generate the trip signal for use in tripping the circuit breaker.

Although the present invention is described in detail in connection with the local filter 16a and relay 18a, it is understood that the remote terminals, including remote filters 16b and 16c and remote relays 18b and 18c, may employ identical circuitry.

Thus, two quantities are derived from the local and remote filter outputs (VFL, VFR1, VFR2), and these two quantities are employed to make the trip decision. The first quantity, VRES, the restraint voltage, is given by:

$$VRES = |VFL| + |VFR1| + |VFR2| \quad (2)$$

The second quantity, VOP, the operating voltage, is given by:

$$VOP = |VFL + VFR1 + VFR2| \quad (3)$$

In systems that use current only in making the trip decision, the phase relationship of the remote and local currents is viewed as the trip criterion. For an internal fault, the currents are essentially in phase whereas, for an external fault, the currents are 180° out of phase. The relationships in equations 2 and 3 make use of this fact since the derived filter outputs follow the same relationship for an internal and an external fault. The operating quantity, VOP, will be zero for an external fault and have a non-zero value otherwise. The restraint quantity, VRES, will generally have a non-zero value since it is the sum of the magnitudes of the remote and local filter signals.

The operating and restraint quantities are then compared as follows to determine whether the circuit breaker should be tripped:

$$VOP - (0.7)VRES \geq VTH \quad (4)$$

If equation 4 is true, then there is an operating, condition or trip condition. The threshold quantity, VTH, is a pre-defined design constant.

Figure 3:
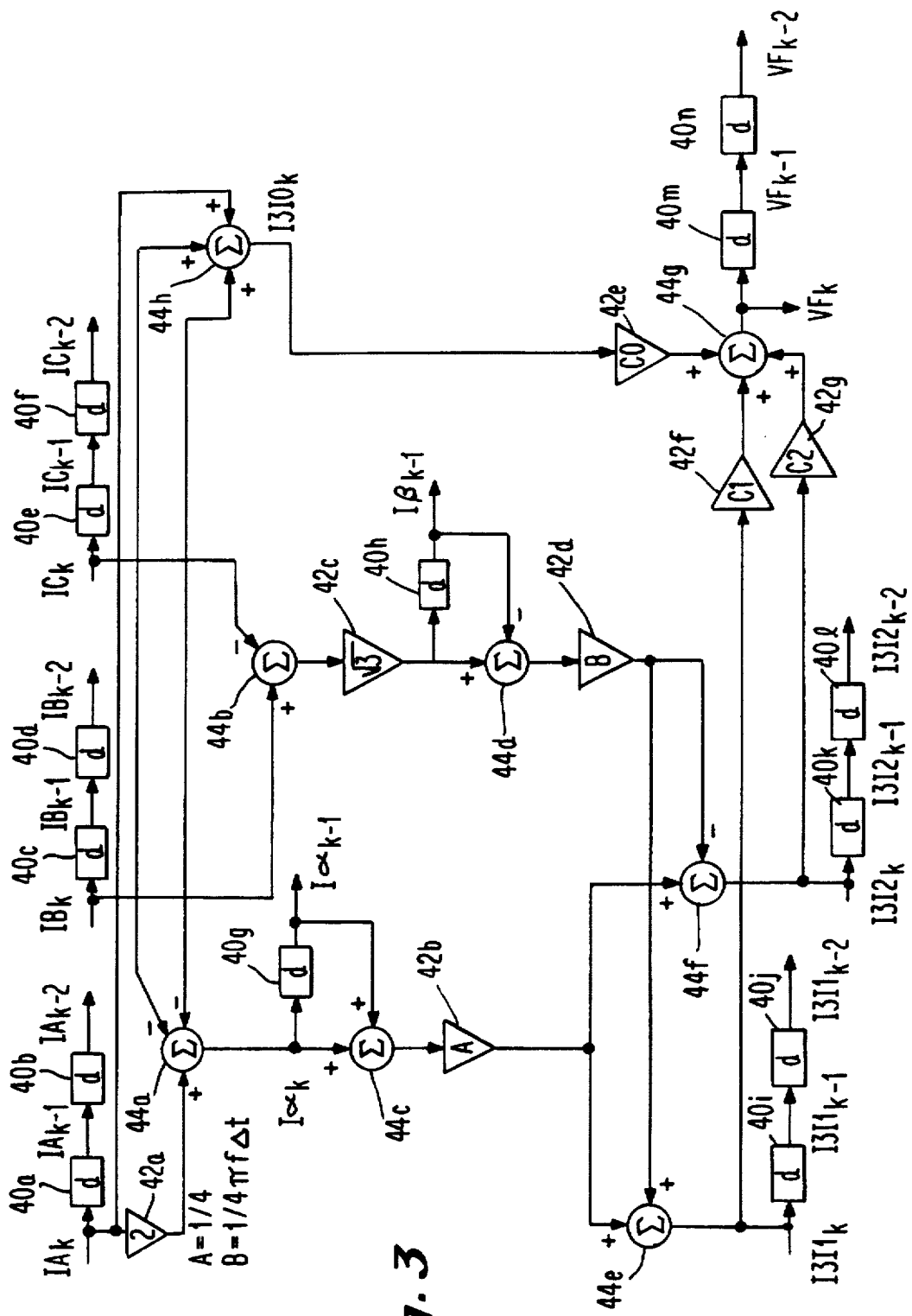
FIG. 3 schematically depicts a presently preferred embodiment of a symmetrical components filter in accordance with the present invention.

One presently preferred embodiment of a symmetrical components filter for use as the local and remote filters 16a, 16b and 16c is schematically depicted in FIG. 3. As shown, three line currents, or quantities derived therefrom, are combined into one filter output signal (VFL$_k$, VFR1$_k$, VFR2$_k$), which is derived from the symmetrical components of the currents. This output signal, denoted generally VF$_k$, is obtained through the use of the Clarke Component-based symmetrical component algorithm. The presently preferred formula for determining the symmetrical components is as follows:

$$I\alpha_k = 2IA_k - IB_k - IC_k \quad (5)$$

$$I\beta_k = \sqrt{3}(IB_k - IC_k) \quad (6)$$

$$I3I1_k = (\tfrac{1}{4})(I\alpha_k - I\alpha_{k-1}) + (\tfrac{1}{4}\pi f \Delta t)(I\beta_k - I\beta_{k-1}) \quad (7)$$

$$I3I2_k = (\tfrac{1}{4})(I\alpha_k - I\alpha_{k-1}) - (\tfrac{1}{4}\pi f \Delta t)(I\beta_k - I\beta_{k-1}) \quad (8)$$

$$I3I0_k = IA_k + IB_k + IC_k \quad (9)$$

$$VF_k = C1\, I3I1_k + C2\, I3I2_k + C0\, I3I0_k \quad (10)$$

FIG. 3 schematically depicts a digital electronic circuit for implementing the above formula. As shown, this circuit comprises a plurality of delay elements 40a through 40n; a plurality of gain units 42a through 42g; and a plurality of summing elements 44a through 44h. Furthermore, as shown, in this embodiment the gain of element 42a is 2, the gain of element 42c is √3, the gain of element 42b is ¼, and the gain of element 42d is ¼πfΔt. It should be noted, however, that the present invention is by no means limited to the use of a symmetrical components filter having the exact same structure as the embodiment depicted in FIG. 3.

Figure 4A:
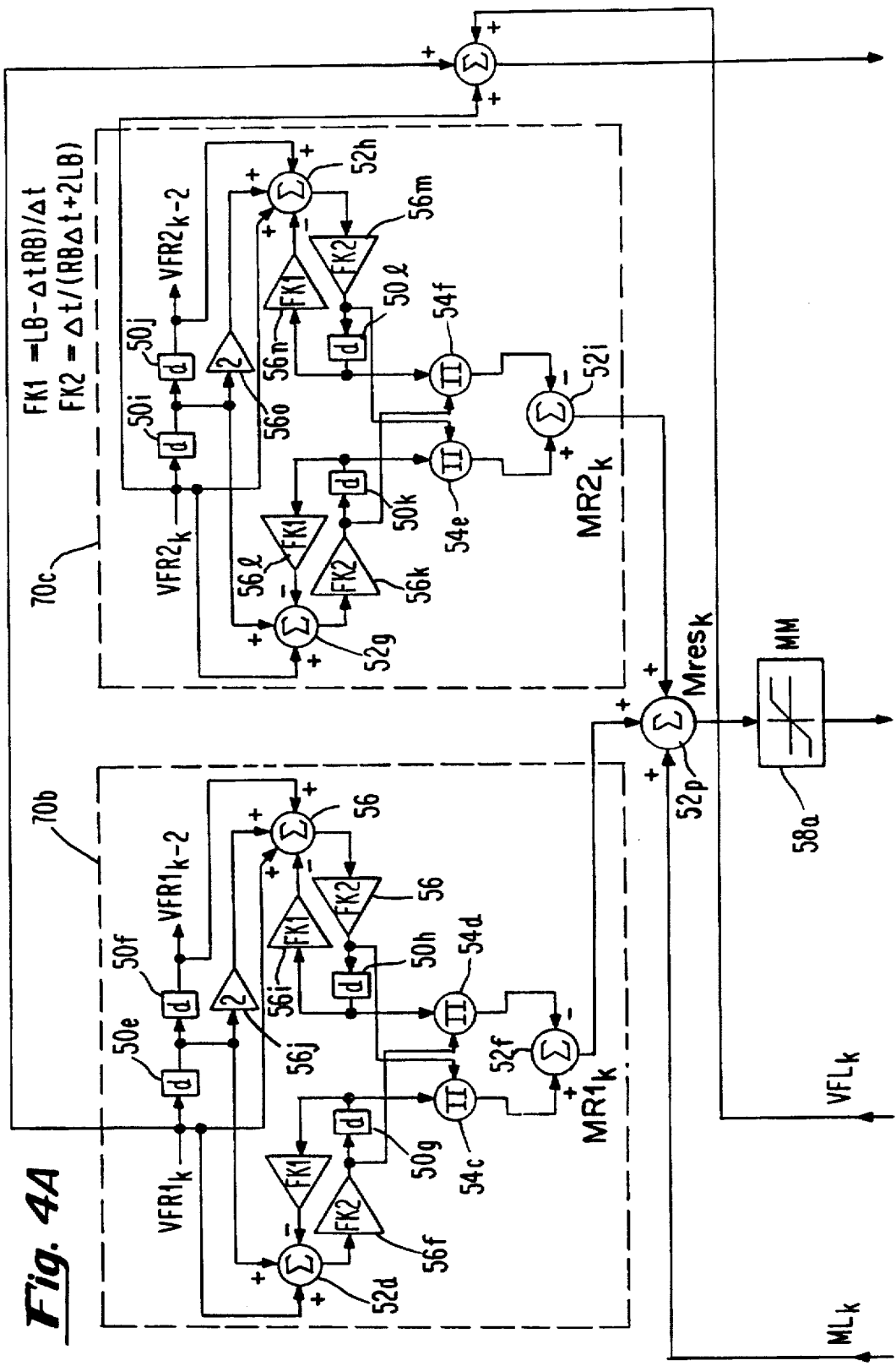
FIG. 4A–4B schematically depict a presently preferred embodiment of a relay circuit comprising multiple threshold units and a numerical trip comparator in accordance with the present invention.
Figure 4B:
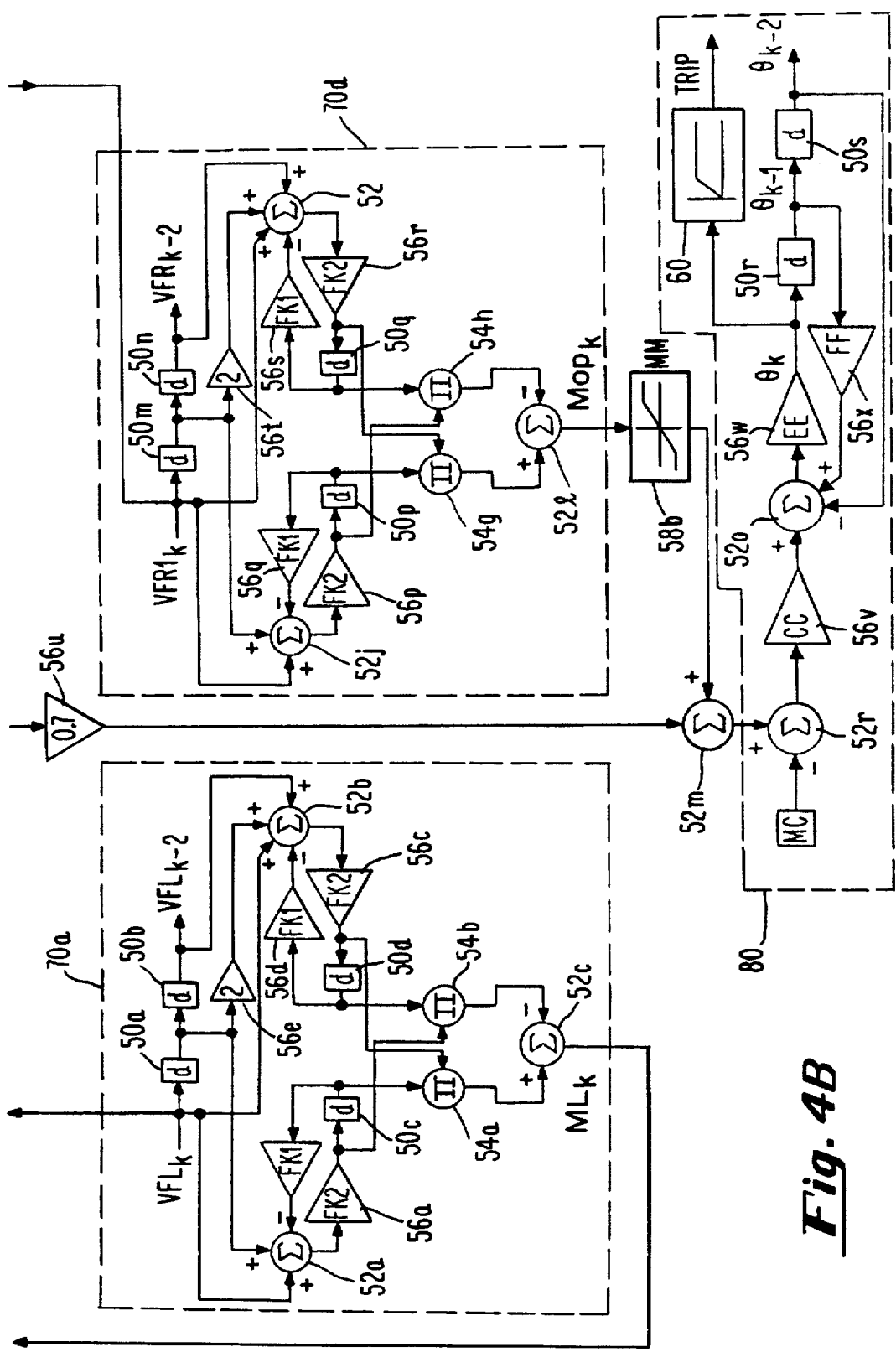
Figure 5:
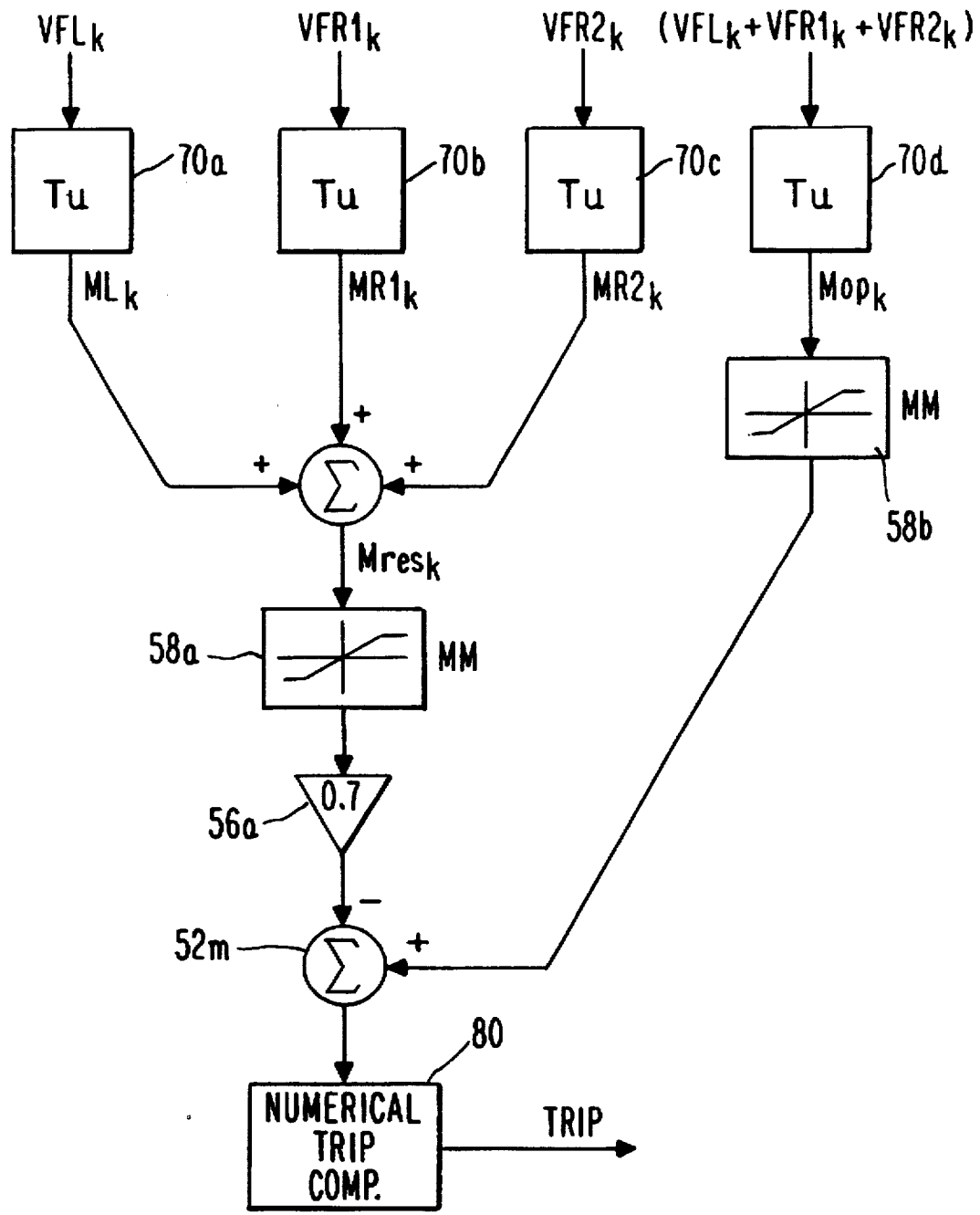
FIG. 5 is a simplified illustration of the relay circuit of FIG. 4A–4B.

A presently preferred embodiment of the relay units 18a, 18b and 18c is illustrated in FIGS. 4A–4B and 5. FIG. 4A and 4B depict an electronic digital circuit embodiment 18'a and FIG. 5 depicts a simplified blocked diagram corresponding to FIG. 4A–4B. As shown, the presently preferred embodiment employs threshold units 70a, 70b, 70c and 70d. Threshold units 70a through 70c respectively receive VFL$_k$, VFR1$_k$ and VFR2$_k$, and output torque signals ML$_k$, MR1$_k$ and MR2$_k$. The torque signals (ML$_k$, MR1$_k$, MR2$_k$) are summed to produce a restraint torque signal MRES$_k$. The restraint torque MRES$_k$ is provided to a limiter unit 58a, which limits the input signal to a selected limit, denoted "MM", and the limited output is provided to a gain unit 56a. Threshold unit 70d receives as its input the summation of VFL$_k$, VFR1$_k$ and VFR2$_k$, and outputs an operating torque signal MOP$_k$. Operating torque signal MOP$_k$ is fed to unit 58b, which is similar to 58a. Summing unit 52m sums the outputs of elements 56a and 58b, and provides a difference signal to numerical comparator 80, which in turn generates a trip signal ("TRIP").

Referring to FIG. 4A–4B, the operation of the relay circuit 18'a will now be explained in greater detail. The inputs to the threshold units 70a, 70b, 70c and 70d are:

$$S1_k = I_k \quad (11)$$

$$S2_k = I_k + I_{k-1} \quad (12)$$

In equations 11 and 12, $I_k$ represents any input (such as, e.g., VFL$_k$) to be evaluated. The torque signal $M_k$ is evaluated using the numerical comparator torque equations:

$$B1_k = FK2(S1_k + S1_{k-1} - FK1\, B1_{k-1}) \quad (13)$$

$$B2_k = FK2(S2_k + S2_{k-1}\, FK1\, B2_{k-1}) \quad (14)$$

$$M_k = (B2_k\, B1_{k-1} - B1_k\, B2_{k-1}) \quad (15)$$

The torque signal produced, generally denoted $M_k$, is an indication of the energy of the input signal ($I_k$). It therefore follows that the following equations are analogous to equations 2 and 3.

$$MRES_k = M(VFL) + M(VFR1) + M(VFR2) \quad (16)$$

$$MOP_k = M(VFL + VFR1 + VFR2) \quad (17)$$

The function M(xx) is the output of the threshold unit (i.e., any one of units 70a through 70d). Equation 4 is implemented using the MC constant of the trip comparator. It follows that the trip criterion is:

$$MOP_k - (0.7)MRES_k \geq MC \quad (18)$$

If inequality 18 is true, the angle $\theta_k$ is permitted to increase until the trip signal (TRIP) is asserted.

The information flow in FIGS. 4A–4B is descriptive of the processing used to obtain the operating and restraining quantities. Note that, in this embodiment, three equal blocks of threshold units are utilized to produce the ML$_k$, MR1$_k$, MR2$_k$ torque signals. When these quantities are added together, the restraint torque signal MRES$_k$ is produced. The local and remote filter outputs (VFL$_k$, VFR1$_k$ and VFR2$_k$) are added and the sum is input to threshold unit 70d to obtain the operating torque signal, MOP$_k$. As shown in FIG. 4, the resultant torque signal generated by summing element 52m is input to the trip comparator 80, which in turn generates the trip signal (TRIP).

Those skilled in the art will appreciate that the present invention can be embodied in apparatus and processes modified from those described above, and so the scope of protection of the following claims is not intended to be limited to the specific embodiments disclosed above. The development of the methods and circuits described above resulted in part from an analysis of the behavior of the mechanical cylinder unit, but the processing details have been modified. The flexibility of the equations, multipliers, ranges, hardware, etc., which are implemented in microprocessor based apparatus, allow the designer to accommodate the behavior of the system with more flexibility than a mechanical actual cylinder unit.

We claim:

1. A protective relaying system for tripping a local circuit breaker (BL) connected to a transmission line by providing a trip signal (TRIP_BL) to said circuit breaker, comprising:
   (a) a local filter operatively coupled to said transmission line, said local filter receiving inputs indicative of phase currents (IA, IB, IC) on said transmission line and providing an output ($VFL_k$) derived from said inputs; and
   (b) a local relay operatively coupled to said filter, said local relay comprising means for (1) receiving said output ($VFL_k$) of said local filter, (2) receiving an output ($VFR1_k$, $VFR2_k$) of at least one remote filter, and (3) generating said trip signal (TRIP_BL);

wherein said local relay employs substantially all digital electronic circuitry to generate said trip signal; and wherein said local relay comprises threshold means for computing a first value ($MRES_k$) and a second value ($MOP_k$) wherein said first value ($MRES_k$) is a function of a sum of the respective energies of said output ($VFL_k$) of said local filter and said output (s) ($VFR1_k$, $VFR2_k$ of said remote filter(s), and wherein said second value ($MOP_k$) is a function of the energy of a sum of said output ($VFL_k$) of said local filter and said output(s) ($VFR1_k$, $VFR2_k$) of said remote filter(s).

2. A protective relaying system as recited in claim 1, wherein said threshold means comprises a first threshold unit for computing a first torque value ($ML_k$), a second threshold unit for computing a second torque value ($MR1_k$), and a third threshold unit for computing a third torque value ($MR2_k$), said first, second and third torque values being generated in accordance with the following formulas:

| Formula for $ML_k$ | | |
|---|---|---|
| $S1\_L_k$ | = | $VFL_k$ |
| $S2\_L_k$ | = | $VFL_k + VFL_{k-1}$ |
| $B1\_L_k$ | = | $FK2 (S1\_L_k + S1\_L_{k-1} - FK1\ B1\_L_{k-1})$ |
| $B2\_L_k$ | = | $FK2 (S2\_L_k + S2\_L_{k-1} - FK1\ B2\_L_{k-1})$ |
| $ML_k$ | = | $(B2\_L_k\ B1\_L_{k-1} - B1\_L_k\ B2\_L_{k-1})$ |
| Formula for $MR1_k$ | | |
| $S1\_R1_k$ | = | $VFR1_k$ |
| $S2\_R1_k$ | = | $VFR1_k + VFR1_{k-1}$ |
| $B1\_R1_k$ | = | $FK2 (S1\_R1_k + S1\_R1_{k-1} - FK1\ B1\_R1_{k-1})$ |
| $B2\_R1_k$ | = | $FK2 (s2\_R1_k + S2\_R1_{k-1} - FK1\ B2\_R1_{k-1})$ |
| $MR1_k$ | = | $(B2\_R1_k\ B1\_R1_{k-1} - B1\_R1_k\ B2\_R1_{k-1})$ |
| Formula for $MR2_k$ | | |
| $S1\_R2_k$ | = | $VFR2_k$ |
| $S2\_R2_k$ | = | $VFR2_k + VFR2_{k-1}$ |
| $B1\_R2_k$ | = | $FK2 (S1\_R2_k + S1\_R2_{k-1} - FK1\ B1\_R2_{k-1})$ |
| $B2\_R2_k$ | = | $FK2 (S2\_R2_k + S2\_R2_{k-1} - FK1\ B2\_R2_{k-1})$ |
| $MR2_k$ | = | $(B2\_R2_k\ B1\_R2_{k-1} - B1\_R2_k\ B2\_R2_{k-1})$; | wherein FK1 and FK2 are predetermined constants.

3. A protective relaying system as recited in claim 2, wherein said threshold means further comprises a fourth threshold unit for computing said second value ($MoP_k$) in accordance with the following formula:

| Formula for $MOP_k$ | | |
|---|---|---|
| $S1\_L\_R1\_R2_k$ | = | $VFL_k + VFR1_k + VFR2_k$ |
| $S2\_L\_R1\_R2_k$ | = | $S1\_L\_R1\_R2_k + S1\_L\_R1\_R2_{k-1}$ |
| $B1\_L\_R1\_R2_k$ | = | $FK2 (S1\_L_k + S1\_L_{k-1} - FK1\ B1\_L_{k-1})$ |

-continued

| Formula for $MOP_k$ | | |
|---|---|---|
| $B2\_L\_R1\_R2_k$ | = | $FK2 (S2\_L_k + S2\_L_{k-1} - FK1\ B2\_L_{k-1})$ |
| $MOP_k$ | = | $(B2\_L_k\ B1\_L_{k-1} - B1\_L_k\ B2\_L_{k-1})$. |

4. A protective relaying system as recited in claim 3, wherein said threshold means further comprises numerical trip comparator means for generating said trip signal (TRIP_BL), wherein said trip signal is a substantially binary signal whose value is set in accordance with the result of the following comparison: $MOP_k-(K1)MRES_k \geq MC$, wherein K1 and MC are predetermined constants.

5. A protective relaying system as recited in claim 4, wherein:
   said numerical trip comparator means comprises means for generating a signal ($\theta_k$) in accordance with the following formula:

$$\theta_k = EE((CC)(MoP_k-(K1)MRES_k-MC)+(FF)\theta_{k-1}-\theta_{k-2}),$$

wherein CC, EE and FF are predetermined constants; and
   said signal ($\theta_k$) is compared to a threshold value and said trip signal (TRIP_BL) is set to a first prescribed state if said signal $\theta_k$ is greater than said threshold value and to a second prescribed state if said signal $\theta_k$ is less than said threshold value.

6. A protective relaying system as recited in claim 1, wherein said local filter comprises substantially all digital electronic circuitry for obtaining digital phase current inputs ($IA_k$, $IB_k$, $IC_k$) and combining said digital phase current inputs to provide said output ($VFL_k$).

7. A protective relaying system as recited in claim 5, wherein said local filter comprises substantially all digital electronic circuitry for obtaining digital phase current inputs ($IA_k$, $IB_k$, $IC_k$) and combining said digital phase current inputs to provide said output ($VFL_k$).

8. A protective relaying system as recited in claim 6, wherein said local filter comprises means for generating said output (VFLk) in accordance with the following formula:

$$I\alpha_k = 2IA_k - IB_k - IC_k$$

$$I\beta_k = K3(IB_k - IC_k)$$

$$I31_k = (K2)(I\alpha_k - I\alpha_{k-1}) + (K2\pi f\Delta t)(I\beta_k - I\beta_{k-1})$$

$$I32_k = (K2)(I\alpha_k - I\alpha_{k-1}) - (K2\pi f\Delta t)(I\beta_k - I\beta_{k-1})$$

$$I30_k = IA_k + IB_k + IC_k$$

$$VF_k = C1\ I31_k + C2\ I32_k + C0\ I30_k.$$

where C1, C2, C0, f, K2, K3 and $\Delta t$ are predetermined constants.

9. A protective relaying system as recited in claim 7, wherein said local filter comprises means for generating said output ($VFL_k$) in accordance with the following formula:

$$I\alpha_k = 2IA_k - IB_k - IC_k$$

$$I\beta_k = K3(IB_k - IC_k)$$

$$I31_k = (K2)(I\alpha_k - I\alpha_{k-1}) + (K2\pi f\Delta t)(I\beta_k - I\beta_{k-1})$$

$$I32_k = (K2)(I\alpha_k - I\alpha_{k-1}) - (K2\pi f\Delta t)(I\beta_k - I\beta_{k-1})$$

$$I30_k = IA_k + IB_k + IC_k$$

$$VF_k = C1\ I31_k + C2\ I32_k + C0\ I30_k.$$

where C1, C2, C0, f, K2, K3 and $\Delta t$ are predetermined constants.

10. A protective relaying system as recited in claim 8 wherein αt is a sampling period, K2 is ¼, and K3 is $\sqrt{(3)}$.

11. A protective relaying system as recited in claim 9, wherein Δt is a sampling period, K2 is ¼, and K3 is $\sqrt{(3)}$.

12. A protective relaying system, comprising:

(a) a local filter operatively coupled to a transmission line, wherein said local filter comprises substantially all digital electronic circuitry for obtaining digital phase current inputs ($IA_k$, $IB_k$, $IC_k$) and combining said digital phase current inputs to provide an output ($VFL_k$); and (b) a local relay operatively coupled to said filter, said local relay comprising means for (1) receiving said output ($VFL_k$), (2) receiving an output ($VFR1_k$, $VFR2_k$) of at least one remote filter, and (3) generating a trip signal (TRIP_BL) for tripping a circuit breaker;

wherein said local relay comprises threshold means for computing a first value ($MRES_k$) and a second value ($MOP_k$); wherein said first value ($MRES_k$) is a function of a sum of the respective energies of said output ($VFL_k$) of said local filter and said output(s) ($VFR1_k$, $VFR2_k$) of said remote filter(s), and wherein said second value ($MOP_k$) is a function of the energy of a sum of said output ($VFL_k$) of said local filter and said output(s) ($VFR1_k$, $VFR2_k$) of said remote filter(s).

13. A protective relaying system as recited in claim 12, wherein said local relay (18a) employs substantially all digital electronic circuitry to generate said trip signal.

14. A protective relaying system as recited in claim 13, wherein said threshold means comprises a first threshold unit for computing a first torque value ($ML_k$), a second threshold unit for computing a second torque value ($MR1_k$), and a third threshold unit for computing a third torque value ($MR2_k$), said first, second and third torque values being generated in accordance with the following formulas:

| Formula for $ML_k$ | | |
|---|---|---|
| $S1\_L_k$ | = | $VFL_k$ |
| $S2\_L_k$ | = | $VFL_k + VFL_{k-1}$ |
| $B1\_L_k$ | = | $FK2\,(S1\_L_k + S1\_L_{k-1} - FK1\,B1\_L_{k-1})$ |
| $B2\_L_k$ | = | $FK2\,(S2\_L_k + S2\_L_{k-1} - FK1\,B2\_L_{k-1})$ |
| $ML_k$ | = | $(B2\_L_k\,B1\_L_{k-1} - B1\_L_k\,B2\_L_{k-1})$ |
| Formula for $MR1_k$ | | |
| $S1\_R1_k$ | = | $VFR1_k$ |
| $S2\_R1_k$ | = | $VFR1_k + VFR1_{k-1}$ |
| $B1\_R1_k$ | = | $FK2\,(S1\_R1_k + S1\_R1_{k-1} - FK1\,B1\_R1_{k-1})$ |
| $B2\_R1_k$ | = | $FK2\,(S2\_R1_k + S2\_R1_{k-1} - FK1\,B2\_R1_{k-1})$ |
| $MR1_k$ | = | $(B2\_R1_k\,B1\_R1_{k-1} - B1\_R1_k\,B2\_R1_{k-1})$ |
| Formula for $MR2_k$ | | |
| $S1\_R2_k$ | = | $VFR2_k$ |
| $S2\_R2_k$ | = | $VFR2_k + VFR2_{k-1}$ |
| $B1\_R2_k$ | = | $FK2\,(S1\_R2_k + S1\_R2_{k-1} - FK1\,B1\_R2_{k-1})$ |
| $B2\_R2_k$ | = | $FK2\,(S2\_R2_k + S2\_R2_{k-1} - FK1\,B2\_R2_{k-1})$ |
| $MR2_k$ | = | $(B2\_R2_k\,B1\_R2_{k-1} - B1\_R2_k\,B2\_R2_{k-1})$; | wherein FK1 and FK2 are predetermined constants.

15. A protective relaying system as recited in claim 14, wherein said threshold means further comprises a fourth threshold unit for computing said second value ($MOP_k$) in accordance with the following formula:

| Formula for $MOP_k$ | | |
|---|---|---|
| $S1\_L\_R1\_R2_k$ | = | $VFL_k + VFR1_k + VFR2_k$ |
| $S2\_L\_R1\_R2_k$ | = | $S1\_L\_R1\_R2_k + S1\_L\_R1\_R2_{k-1}$ |

-continued

| Formula for $MOP_k$ | | |
|---|---|---|
| $B1\_L\_R1\_R2_k$ | = | $FK2\,(S1\_L_k + S1\_L_{k-1} - FK1\,B1\_L_{k-1})$ |
| $B2\_L\_R1\_R2_k$ | = | $FK2\,(S2\_L_k + S2\_L_{k-1} - FK1\,B2\_L_{k-1})$ |
| $MOP_k$ | = | $(B2\_L_k\,B1\_L_{k-1} - B1\_L_k\,B2\_L_{k-1})$. |

16. A protective relaying system as recited in claim 15, wherein said threshold means further comprises numerical trip comparator means for generating said trip signal (TRIP_BL), wherein said trip signal is a substantially binary signal whose value is set in accordance with the result of the following comparison: $MOP_k - (K1)MRES_k \geq MC$, wherein K1 and MC are predetermined constants.

17. A protective relaying system as recited in claim 16, wherein:

said numerical trip comparator means comprises means for generating a signal ($\theta_k$) in accordance with the following formula:

$$\theta_k = EE((CC)\,(MOP_k - (K1)MRES_k - MC) + (FF)\theta_{k-1} - \theta_{k-2}),$$

wherein CC, EE and FF are predetermined constants; and said signal ($\theta_k$) is compared to a threshold value and said trip signal (TRIP_BL) is set to a first prescribed state if said signal $\theta_k$ is greater than said threshold value and to a second prescribed state if said signal $\theta_k$ is less than said threshold value.

18. A protective relaying system as recited in claim 12 wherein said local filter comprises means for generating said output ($VFL_k$) in accordance with the following formula:

$$I\alpha_k = 2IA_k - IB_k - IC_k$$

$$I\beta_k = K3(IB_k - IC_k)$$

$$I3I1_k = (K2)(I\alpha_k - I\alpha_{k-1}) + (K2\pi f \Delta t)(I\beta_k - I\beta_{k-1})$$

$$I3I2_k = (K2)(I\alpha_k - I\alpha_{k-1}) - (K2\pi f \Delta t)(I\beta_k - I\beta_{k-1})$$

$$I3I0_k = IA_k + IB_k + IC_k$$

$$VF_k = C1\,I3I_k + C2\,I3I2_k + C0\,I3I0_k.$$

wherein C1, C2, C0, f, K2, K3 and Δt are predetermined constants.

19. A protective relaying system as recited in claim 17, wherein said local filter comprises means for generating said output ($VFL_k$) in accordance with the following formula:

$$I\alpha_k = 2IA_k - IB_k - IC_k$$

$$I\beta_k = K3(IB_k - IC_k)$$

$$I3I1_k = (K2)(I\alpha_k - I\alpha_{k-1}) + (K2\pi f \Delta t)(I\beta_k - I\beta_{k-1})$$

$$I3I2_k = (K2)(I\alpha_k - I\alpha_{k-1}) - (K2\pi f \Delta t)(I\beta_k - I\beta_{k-1})$$

$$I3I0_k = IA_k + IB_k + IC_k$$

$$VF_k = C1\,I3I_k + C2\,I3I2_k + C0\,I3I0_k.$$

wherein C1, C2, C0, f, K2, K3 and Δt are predetermined constants.

20. A protective relaying system as recited in claim 18, wherein Δt is a sampling period, K2 is ¼, and K3 is $\sqrt{(3)}$.

21. A protective relaying system as recited in claim 19, wherein Δt is a sampling period, K2 is ¼, and K3 is $\sqrt{(3)}$.

* * * * *

UNITED STATES PATENT AND TRADEMARK OFFICE
CERTIFICATE OF CORRECTION

PATENT NO. : 5,796,629
DATED : August 18, 1998
INVENTOR(S) : Fernando Calero et al.

It is certified that error appears in the above-identified patent and that said Letters Patent is hereby corrected as shown below:

Col. 9, line 2 (claim 10), delete "$\alpha t$" and substitute therefor --$\Delta t$--.

Col. 10, line 30 (claim 18), delete "s aid l ocal" and substitute therefor --said local--

Signed and Sealed this

Fifteenth Day of December, 1998

*Attest:*

BRUCE LEHMAN

*Attesting Officer*     *Commissioner of Patents and Trademarks*